US012746477B2

(12) United States Patent
Qian et al.

(10) Patent No.: US 12,746,477 B2
(45) Date of Patent: Sep. 29, 2026

(54) INTERACTION METHOD, APPARATUS, DEVICE AND STORAGE MEDIUM IN VIRTUAL ENVIRONMENT

(71) Applicant: Beijing Zitiao Network Technology Co., Ltd., Beijing (CN)

(72) Inventors: Hongtu Qian, Beijing (CN); Shixiong Tang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 339 days.

(21) Appl. No.: 18/395,179

(22) Filed: Dec. 22, 2023

(65) Prior Publication Data

US 2024/0216818 A1 Jul. 4, 2024

(30) Foreign Application Priority Data

Jan. 4, 2023 (CN) ......................... 202310010412.2

(51) Int. Cl.
*A63F 13/69* (2014.01)
*A63F 13/537* (2014.01)
*A63F 13/58* (2014.01)

(52) U.S. Cl.
CPC ............ *A63F 13/69* (2014.09); *A63F 13/537* (2014.09); *A63F 13/58* (2014.09)

(58) Field of Classification Search
None
See application file for complete search history.

(56) References Cited

U.S. PATENT DOCUMENTS

2009/0318234 A1 12/2009 Christensen et al.
2020/0368623 A1* 11/2020 Wu ......................... A63F 13/58

FOREIGN PATENT DOCUMENTS

CN 108479066 A 9/2018
CN 109815678 A 5/2019
CN 111714884 A 9/2020
CN 111888770 A 11/2020
CN 113633982 A 11/2021
CN 114222610 A 3/2022
CN 114432699 A 5/2022

OTHER PUBLICATIONS

Office Action for Chinese Patent Application No. 202310010412.2, mailed on May 20, 2025, 14 pages.

* cited by examiner

*Primary Examiner* — Damon J Pierce
(74) *Attorney, Agent, or Firm* — Astute IP Law Group

(57) ABSTRACT

According to an embodiment of the present disclosure, an interaction method, apparatus, device, and storage medium in a virtual environment are provided. The method comprises: receiving a first request to associate a first character with a first place in a virtual environment, the first character having been associated with a second place; presenting a first space corresponding to the first place in the virtual environment; and providing a first set of virtual items available to the first character in the first space, and disabling a second set of virtual items corresponding to the first set of virtual items in the second place for the first character, wherein a first set of attributes of the first set of virtual items are determined based on a second set of attributes of the second set of virtual items.

18 Claims, 9 Drawing Sheets

INTERACTION METHOD, APPARATUS, DEVICE AND STORAGE MEDIUM IN VIRTUAL ENVIRONMENT

CROSS REFERENCE

The present application claims priority to Chinese Patent Application No. 202310010412.2, entitled "INTERACTION METHOD, APPARATUS, DEVICE AND STORAGE MEDIUM OF IN VIRTUAL ENVIRONMENT" filed on Jan. 4, 2023, the contents of which are hereby incorporated by reference in its entirety.

FIELD

Example embodiments of the present disclosure generally relate to the field of computers, and in particular to an interactive method, apparatus, electronic device, and computer-readable storage media in a virtual environment.

BACKGROUND

With the development of computer technology, various forms of electronic devices can greatly enrich people's daily lives. For example, people can use electronic devices for various interactions in virtual environments.

In some interactive scenarios, users can operate characters in a virtual environment and interact with virtual items in the virtual environment through the characters. Therefore, people expect to improve the friendliness of interacting with these virtual items, especially when social relationships and virtual items are combined, the interaction form is often single and not interesting enough.

SUMMARY

In the first aspect of the present disclosure, an interaction method in a virtual environment is provided. The method comprises: receiving a first request to associate a first character with a first place in a virtual environment, the first character having been associated with a second place; presenting a first space corresponding to the first place in the virtual environment; and providing a first set of virtual items available to the first character in the first space, and disabling a second set of virtual items corresponding to the first set of virtual items in the second place for the first character, wherein a first set of attributes of the first set of virtual items are determined based on a second set of attributes of the second set of virtual items.

In the second aspect of the present disclosure, an apparatus for interaction in a virtual environment is provided. The apparatus comprises: a receiving module, configured to receive a first request to associate a first character with a first place in a virtual environment, the first character having been associated with a second place; a presenting module, configured to present a first space corresponding to the first place in the virtual environment; and a providing module, configured to provide a first set of virtual items available to the first character in the first space, and disabling a second set of virtual items corresponding to the first set of virtual items in the second place for the first character, wherein a first set of attributes of the first set of virtual items are determined based on a second set of attributes of the second set of virtual items.

In the third aspect of the present disclosure, an electronic device is provided. The device includes at least one processing unit; and at least one memory, the at least one memory being coupled to the at least one processing unit and storing instructions for execution by the at least one processing unit. The instructions cause the device to perform the method of the first aspect when executed by the at least one processing unit.

In the fourth aspect of the present disclosure, a computer-readable storage medium is provided. The medium stores a computer program that implements the method of the first aspect when executed by a processor.

It should be understood that the content described in the content section of the present invention is not intended to limit the key features or important features of the embodiments of the present disclosure, nor is it intended to limit the scope of the present disclosure. Other features of the present disclosure will be easily understood by the following description.

BRIEF DESCRIPTION OF THE DRAWINGS

In conjunction with the accompanying drawings and with reference to the following detailed description, the above and other features, advantages, and aspects of each embodiment of the present disclosure will become more apparent. In the drawings, the same or similar reference numerals indicate the same or similar elements, where.

DETAILED DESCRIPTION

Figure 1:
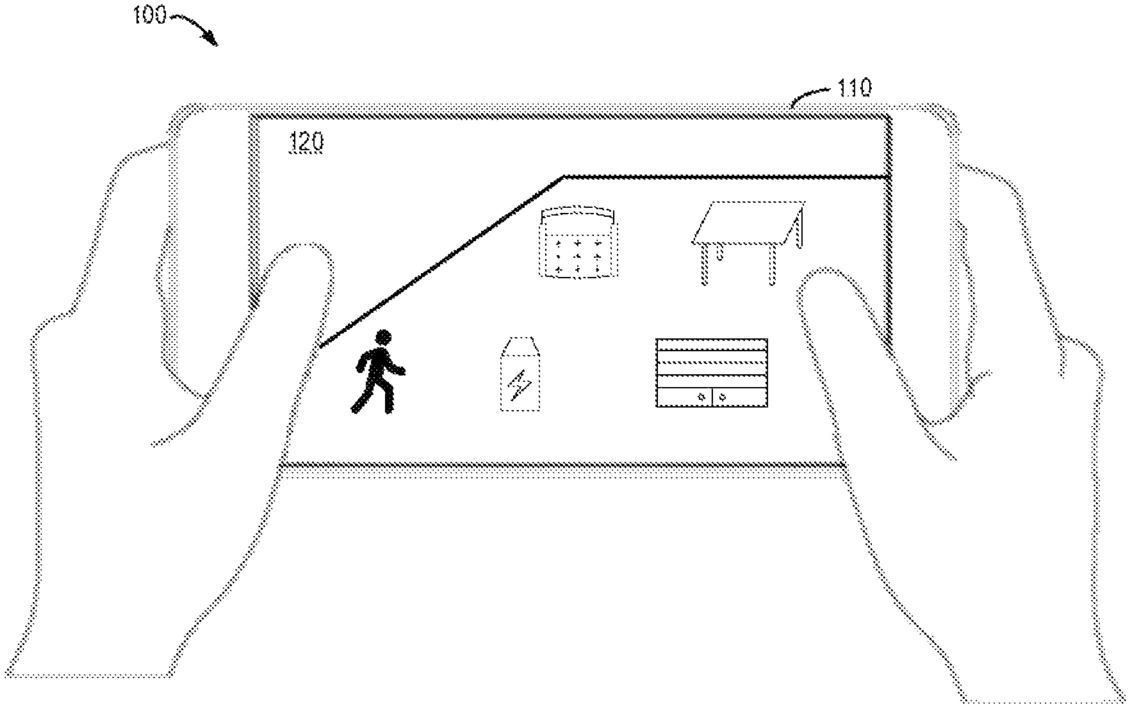
FIG. 1 shows a schematic diagram of an example environment in which the present disclosure can be implemented.

The following will describe the embodiments of the present disclosure in more detail with reference to the accompanying drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of protection of the present disclosure.

In the description of the embodiments of the present disclosure, the term "including" and similar terms should be understood as open-ended inclusion, that is, "including but not limited to". The term "based on" should be understood as "at least partially based on". The terms "one embodiment" or "the embodiment" should be understood as "at least one embodiment". The term "some embodiments" should be understood as "at least some embodiments". The following may also include other explicit and implicit definitions.

As discussed above, in general, users can operate characters in virtual environments to enter virtual places (referred to as place or place), to interact with virtual items in the places (such as virtual sofas, virtual water cups, etc.), and use the functions corresponding to the virtual items. For example, users operate characters to rest on virtual sofas. Furthermore, in order to better meet users' social and freedom requirements and match their usage habits, users are usually fixedly associated with a place for a long time. In this place, users can choose virtual items in the place according to their personal preferences, as well as the placement of virtual items. In addition, in some virtual environments that can provide social attributes, the characters of multiple users with identity-related relationships (such as "roommate" relationship, "partner" relationship) will be associated with the same place, so as to facilitate private interaction between users and enhance their social experience.

Furthermore, in order to ensure that all users have an equal interactive experience, the provider of the virtual environment usually sets an upper limit on the number of places where a user is permanently and fixedly associated. For example, the provider only allows a user to be permanently and fixedly associated with one place in the virtual environment.

However, in this configuration method, due to the setting and presentation of virtual items associated with the place, users cannot use virtual items without entering the place. For example, when the character is too far away from the place, the user has disputes with other users associated with the place, and it is inconvenient or undesirable to return to the associated place, the user place uses the associated virtual items, which greatly affects the user experience. This problem is particularly prominent when the function implemented by virtual items is the basic function (such as supplementing the character's physical strength).

One feasible way is to associate the character with a new place after removing the association with the original place, and then use the new place to provide virtual items that the character can use.

However, in this method, after the character is associated with other places, there are problems such as the need for users to adjust the virtual items presented in the place and the placement of the virtual items, which increases user consumption. Moreover, this problem is particularly evident because the user is inconvenient and does not expect to return to the original associated place, which is usually temporary. Furthermore, as discussed above, in the case of associating multiple user characters to the same place, it is also necessary to frequently release and establish the association between roles, which causes great burden to the provider of the virtual environment and the user.

The disclosed embodiment proposes an interaction solution in a virtual environment. According to the scheme, a first request is received to associate a first character already associated with a second place with a first place in the virtual environment; a first space corresponding to the virtual environment and the first place is presented, a first set of virtual items available to the first character are provided in the first space, and the second set of virtual items corresponding to the first set of virtual items in the second place are disabled for the first character, where a first set of attributes of the first set of virtual items are determined based on a second set of attributes of the second set of virtual items.

Therefore, in the disclosed embodiment, on the one hand, it is possible to associate a character with a place for using virtual items, so that the character can still use virtual items without affecting the original place association relationship. On the other hand, it is possible to adjust the availability of virtual items in the original associated place to avoid disrupting interaction balance. Therefore, users can flexibly choose a place for using virtual items.

The following further describes various exemplary implementations of the scheme in conjunction with the accompanying drawings. In order to illustrate the principles and ideas of the disclosed embodiments, some descriptions below will refer to the gaming field. However, it will be understood that this is only exemplary and is not intended to limit the scope of the disclosure in any way. The disclosed embodiments can be applied to various fields such as simulation, simulation, virtual reality, and augmented reality.

Example Environment

Referring first to FIG. 1, a schematic diagram of an example environment 100 in which exemplary implementations according to the present disclosure may be implemented is schematically shown. As shown in FIG. 1, the example environment 100 may include an electronic device 110.

In some embodiments, as shown in FIG. 1, the electronic device 110 may include, for example, a suitable type of portable device that may support, for example, a user's two-handed grip for various interactive operations. such an electronic device 110 may include, but is not limited to, a smartphone, a tablet, a handheld computer, a portable gaming end point, and the like.

Such an electronic device 110 may include, for example, an appropriate type of sensor for detecting user gestures. For example, the electronic device 110 may include a touch screen for detecting various types of gestures made by the user on the touch screen. Alternatively or additionally, the electronic device 110 may also include other appropriate types of sensing devices, such as proximity sensors, to detect various types of gestures made by the user within a predetermined distance above the screen.

It should be understood that although electronic device 110 is shown as a portable device in FIG. 1, this is only exemplary. In still other embodiments, electronic device 110 may also be in other suitable forms. For example, electronic device 110 may include a display device for display and a computing device for computing, and the display device and computing device may be physically coupled or separated, for example.

For example, electronic device 110 may include a display screen for screen display and a game console for screen rendering and game control.

In this scenario, the electronic device 110 may, for example, utilize other suitable input devices to achieve interaction. For example, the electronic device 110 may achieve interaction through appropriate interactive devices such as a communicatively coupled keyboard, mouse, joystick, and gamepad.

It should be understood that the electronic device 110 can obtain the required resources (e.g., the required resources are stored for other computing devices) by communicating with other computing devices (not shown in the figure), such as computing systems/servers, such as mainframes, edge computing nodes, server-level devices in cloud environments, etc. For example, the electronic device 110 can communicate with the server to obtain image resources for presenting places and spaces in the virtual environment, upload usage data of virtual items, and result data after using virtual items.

With continued reference to FIG. 1, as shown in FIG. 1, the electronic device 110 may, for example, present a graphical interface 120, which may, for example, present a corresponding virtual environment. Illustratively, the graphical interface 120 may be various types of virtual environment interaction interfaces. For example, the graphical interface 120 may include a game application interface to present a corresponding game scene. Alternatively, the graphical interface 120 may be other suitable type of interaction interface that may support the user to control virtual objects in the interface to perform corresponding actions in the virtual environment.

The following will detail the specific process of interacting with virtual objects in a virtual environment.

Example Interactions

In order to enable a user to flexibly choose places for using virtual items without affecting the association relationship of the original place and disrupting the interactive balance, the disclosed embodiment can associate the first character that the user has been associated with the second place with the first place according to the user's request, so that the first character can use the first set of virtual items in the first place to achieve the same function as the second set of virtual items in the second place. Furthermore, in this case, the first character can be prohibited from using the second set of virtual items in the second place to ensure that all users have an equal interactive experience.

FIGS. 2A, 2B, 2C, 2D, 2E, 2F, and 2G illustrate examples 200A, 200B, 200C, 200D, 200E, 200F, and 200G in accordance with some embodiments of the present disclosure. As described above, such interfaces in examples 200A, 200B, 200C, 200D, 200E, 200F, and 200G may include, for example, a graphical interface 120 associated with a virtual environment. Such virtual environments may include, but are not limited to, various types of game environments, simulation environments, or simulation environments.

In some embodiments, a user can, for example, manipulate a virtual character (referred to as "character") in a virtual environment, which can have a corresponding virtual image in the virtual environment and can move in the virtual environment.

In some examples, a character in a virtual environment may, for example, be associated with a particular place in the virtual environment (also known as a virtual place, or place or venue for short). For example, each character may, for example, have its corresponding "home place", and the user can control the character to change the layout in the "home place" and use virtual items in the "home place" to perform various virtual tasks.

In some embodiments, multiple characters can also be associated with the same "home place". For example, one character (e.g., character A) corresponding to user A can create its corresponding "home place", and another character (e.g., character B) corresponding to another user B can apply to join the "home place" to become roommate of character A. In this case, characters A and B can establish specific associations such as "roommate" relationship in the virtual environment, and can use some specific virtual items in the common "home place", such as production tools, etc.

In order to enrich the user's interactive realism in the virtual environment, the corresponding character of the user can also be associated with other types of places in the virtual environment. Unlike the homestead-like private places introduced above, such other types of places can be public places that can be provided for appropriate characters in the virtual environment. For example, such public places can include "hospice places", which can be open to all characters in the virtual environment or only to characters with specific associations in the place, such as only to specific characters with "roommate" relationships.

In some embodiments, a user may, for example, initiate a first request to associate a corresponding character (also referred to as a first character) to a first place in the virtual environment (e.g., a "hospice place" as discussed above) through a graphical interface. Illustratively, a user may initiate a first request to associate a corresponding first character to a first place in the virtual environment by performing a specific action in the virtual environment or by performing a specific interaction in the graphical interface.

Figure 2A:
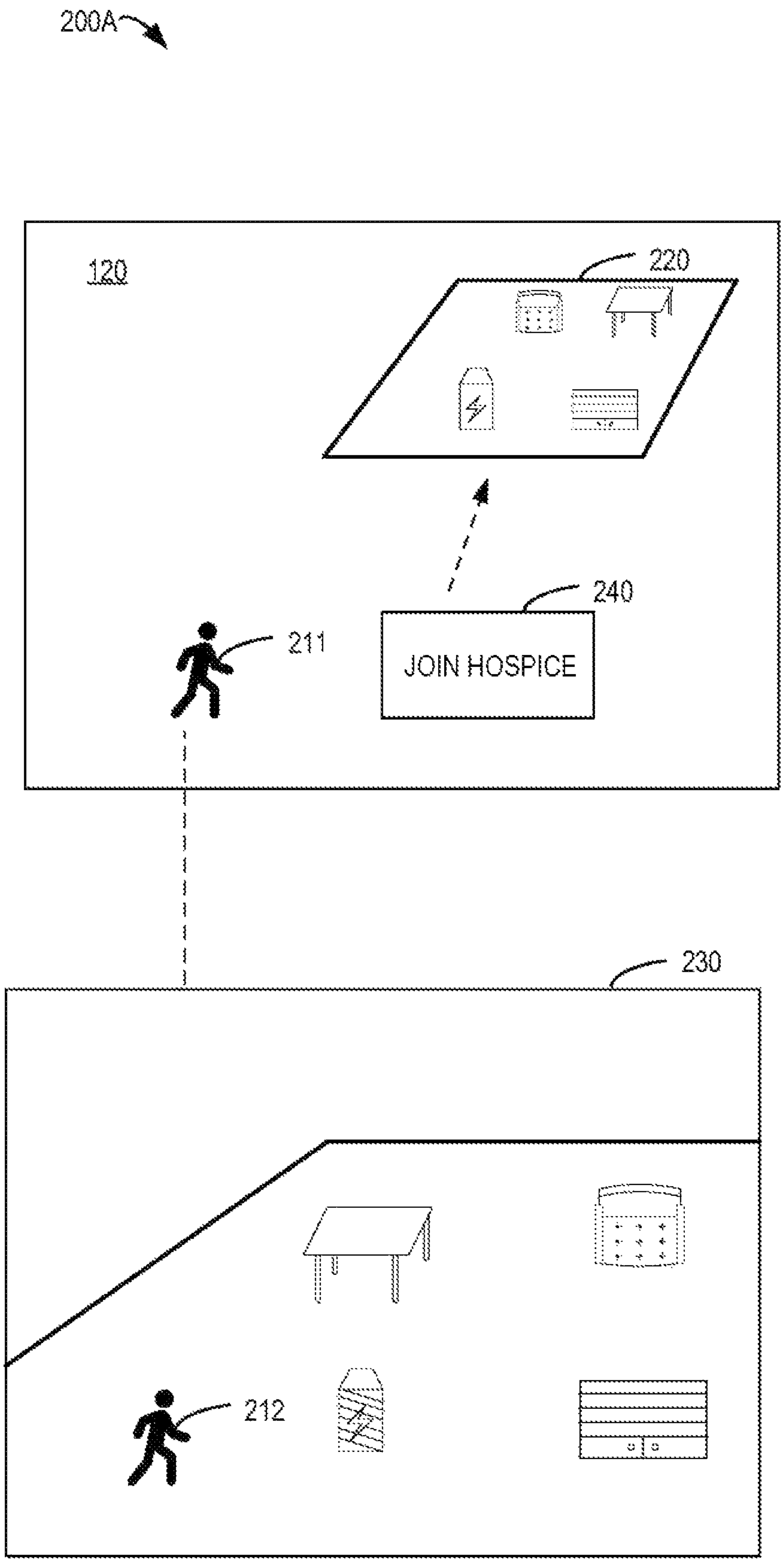
FIGS. 2A, 2B, 2C, 2D, 2E, 2F, and 2G illustrate example interfaces according to some embodiments of the present disclosure.

As shown in FIG. 2A, the graphical interface 120 may be an interface for associating the first character 211 to the first locality. Illustratively, the graphical interface 120 may present the first character 211 and a request entry 240 for sending the first request. The user may initiate a first request to associate the first character 211 to the first place 220 in the virtual environment, for example, by selecting the request entry 240.

Such a first character 211 may, for example, have been associated with the second place 230, for example, with the "home place" discussed above. Illustratively, the behavior of the first character 211 requesting association with the first place 220 (for example, joining the "hospice place" behavior) may also be referred to as "running away from home" behavior. Correspondingly, the reason for such "running away from home" behavior may be, for example, conflicts or disputes between multiple characters in the "home place" or between users, causing the first character 211 to run away from home. Therefore, the first character 211 can increase social distance and obtain a buffer period for alleviating conflicts by requesting association with the first place to avoid losses caused by impulsive decisions.

In some embodiments, the spatial layout and/or display style of the first place 220 and the second place 230 may be different, thereby differentially configuring the spatial layout of the first place and the second place to provide users with novel and differentiated interactive experiences.

In some embodiments, the electronic device 120 may also adjust the visual style and location of the request entry 240, for example, the request entry 240 is a virtual foreground set at the entry location of the first place 220. Accordingly, the user can communicate with the virtual foreground by operating the first character 211 to send the first request.

In some embodiments, as described above, the entry for joining or associating with the first place 220 will only be opened to the first place 211 if the second place 230 is also associated with the second character 212. Illustratively, the first character 211 can only have the authority to join the "hospice place" after the first character 211 and the second character 222 form a "roommate" relationship for a specific "home place". Therefore, users who can be associated with the first place are filtered, making the first place more suitable for adjusting social distance between users. In some embodiments, the first character 211 can be any member of the "home place", such as an owner or a non-owner.

In some embodiments, the "hospice place" may have multiple preset types of rooms, such as the first type of room, the second type of room, and each preset type of room may have different space areas, different virtual items, different visual styles, etc. Different types of rooms in the "hospice place" may also correspond to different specific virtual resources (such as virtual wealth in the virtual environment)

consumption, which is also called “room usage fee”. Correspondingly, the first place 220 may correspond to a specific room in the “hospice”.

In some embodiments, after the electronic device 110 receives the first request, a selection interface of the first place 220 may be presented in the graphic interface 120, for example, a room type selection interface in a “hospice place” may be presented, for example, the room type selection interface may include information for introducing the room type, virtual items included in the room type, resource consumption, etc., and a confirmation entry related to the room type. The user may select the confirmation entry in the graphic interface 120 to determine the room type. Accordingly, the electronic device 110 may determine the first place 220 based on the room type selected by the user.

In some embodiments, virtual items are visual elements that are associated with functions and presented in the place. Users can interact with virtual items by manipulating characters and using virtual items to achieve the functions associated with virtual items, for example, manufacturing functions, supply functions, etc. For example, in the “home place”, virtual items can be production tools used to achieve manufacturing functions, such as equipment manufacturing stations, consumables manufacturing stations, etc.

In some embodiments, the electronic device 110 may provide an entry to the first character 211 for joining or associating with the first place 220 only if the second place 230 is also associated with the second character 212. Illustratively, the first character 211 can only have permission to join the “hospice place” after the first character 211 and the second character 212 form a “roommate” relationship for a specific “home place”. In some embodiments, the first character 211 may be the owner or non-owner of the “home place”.

In some embodiments, the first place 220 and the second place 230 may correspond to different virtual spaces (referred to as spaces) in the virtual environment, which may have different positions in the virtual environment, for example. Users can enter different spaces in the virtual environment by manipulating the first character 211 to access the corresponding places and use the virtual items provided in the places.

Further, in the case of receiving a first request to associate a first character (e.g., first character 211) to a first place, the electronic device 110 may provide a graphical interface associated with the first place 220 to present the first place through the graphical interface, or to present the content of the first space corresponding to the first place in the virtual environment.

Further, the electronic device 110 provides a first set of virtual items available to the first character in the first space, and disables the second set of virtual items corresponding to the first set of virtual items in the second place for the first character, wherein a first set of attributes of the first set of virtual items are determined based on a second set of attributes of the second set of virtual items.

In an embodiment of the present disclosure, the electronic device 110 may provide a graphical interface associated with the first place 220, such as a spatial interface presenting the content of the first space, and an access entry may be provided in the graphic interface associated with the first set of virtual items available in the first place 220. The first set of virtual items provided by the electronic device 110 in the first space may be determined at least in part based on the second set of virtual items in the second place.

In some examples, the functions that can be achieved by the first set of virtual items correspond to the functions that can be achieved by the second set of virtual items. For example, in the case where the first place 220 is a “hospice place” and the second place 230 is a “home place”, the electronic device 110 may determine to provide the equipment manufacturing station and consumable manufacturing station in the “hospice place” based on the equipment manufacturing station and consumable manufacturing station included in the “home place”.

Furthermore, in some embodiments, after the electronic device 110 provides the first set of virtual items in the first space, it can also disable some and/or all of the virtual items in the second set of virtual items. In some embodiments, the electronic device 110 disables the production-related virtual items in the second set of virtual items for the first character to avoid the first character using virtual items in different places for production at the same time, with higher productivity than other users, and to avoid disrupting interaction balance.

Furthermore, the electronic device 110 determines the first set of attributes of the first set of virtual items based on the second set of attributes of the second set of virtual items. In some embodiments, the attributes are associated with the functions implemented by the virtual items. For example, when the virtual items are equipment manufacturing stations or consumables manufacturing stations used for production and manufacturing, the attributes can be, for example, the manufacturing capabilities of the first character for items such as equipment and consumables. Thus, the usage capabilities of the first character for the first set of virtual items and the second set of virtual items are synchronized.

Figure 2B:
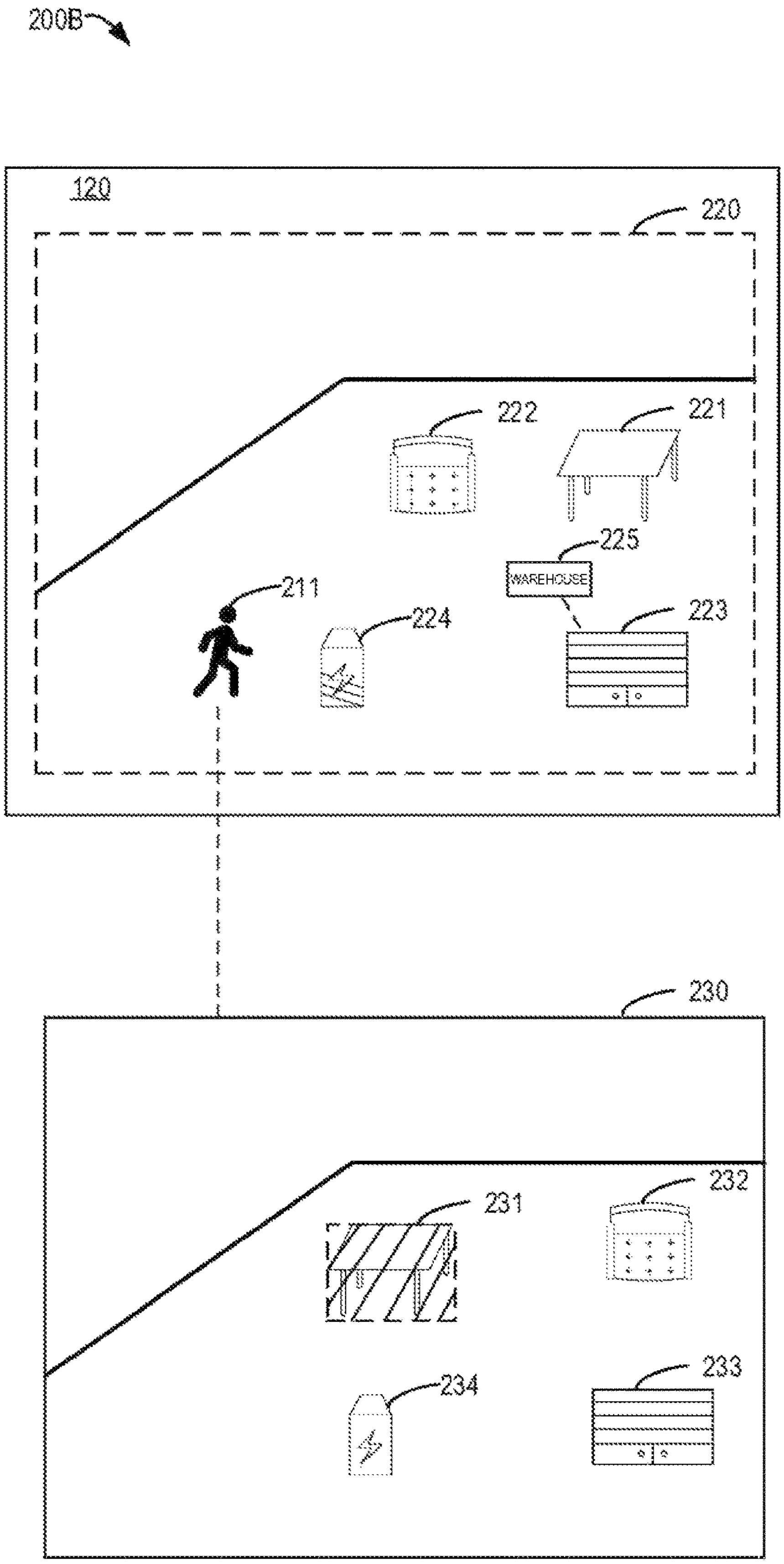

For example, refer to FIG. 2B, which shows an example interface implemented according to the present disclosure.

In FIG. 2B, the electronic device 110 presents the second set of virtual items of the second place 230. In some embodiments, the electronic device 110 can configure visual styles (also referred to as styles) for the functions corresponding to the virtual items. For example, in the case where the function is to manufacture items (such as equipment manufacturing tables, consumables manufacturing tables), the style of the virtual items is a workbench. For example, in the case where the function is to rest, the style of the virtual items is a sofa. For example, in the case where the function is to store items, the style of the virtual item is a warehouse. For example, in the case where the function is to supplement energy, the style of the virtual item is a charging interface. For example, the equipment manufacturing table 231, sofa 232, warehouse 233, and charging interface 234 in the “home place” are used to determine the equipment manufacturing table 221, sofa 222, warehouse 223, and charging interface 224 provided to the first place 220.

Furthermore, the electronic device 110 may partially disable the virtual items of the second place 230, such as the equipment manufacturing station 231 for producing and manufacturing items. In some embodiments, the electronic device 110 may also change the presentation style of the disabled virtual items (such as the equipment manufacturing station 231), so that after the first character enters the place (such as the second place 230), it is shown that the virtual items are disabled based on the presentation style.

In some embodiments, the electronic device 110 may configure virtual items for each place to be available to the first character for functions that allow the first character to be used in different places without disrupting the balance of interactions, such as storing items. In some embodiments, the electronic device 110 responds to the first character being located in the first space by providing a first warehouse entry for accessing the private warehouse space of the first character. Further, the electronic device 110 responds to the first character being located in the second space by providing a second warehouse entry for accessing the private warehouse space of the first character, where the first warehouse entry and the second warehouse entry correspond to the same data.

Specifically, the electronic device 110 provides a warehouse entry for accessing the private warehouse space of the first character after detecting that the first character enters the space corresponding to the place. The first character can enter the same private warehouse by selecting the warehouse entry. Therefore, such a private warehouse can simulate the backpack storage function in the real world and improve the realism of interaction.

Illustratively, referring to FIG. 2B, the electronic device 110 detects that the first character 211 enters the first space corresponding to the first place 220, and provides a first warehouse entry 225 for accessing the private warehouse space of the first character.

Figure 2C:
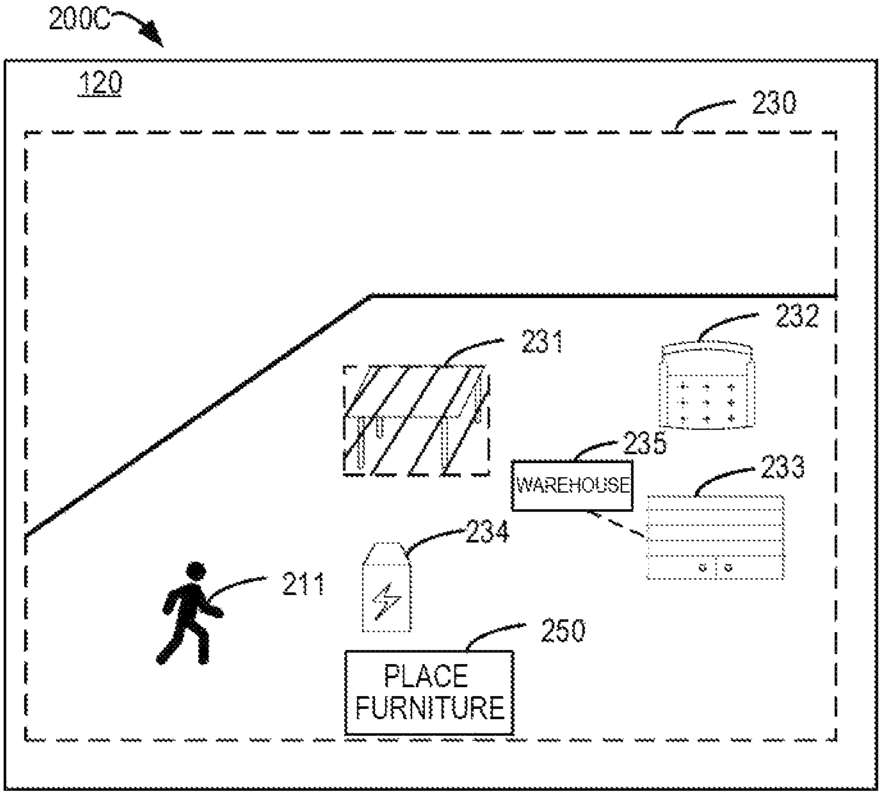

Illustratively, reference may also be made to FIG. 2C, which illustrates an example interface according to an embodiment of the present disclosure. When the electronic device 110 detects that the first character 211 has entered the second space corresponding to the second place 230, a second warehouse entry 235 for accessing the private warehouse space of the first character is provided.

After the first warehouse entry 225 and the second warehouse entry 235 are selected for the first character 211, the same data can be presented, or in other words, the first warehouse entry 225 and the second warehouse entry 235 point to the same warehouse. Therefore, in the virtual environment, for example, the private warehouse entry corresponding to the "backpack space" is always accessible to the character, and the content therein is not affected by the place.

In some embodiments, the first set of virtual items comprise a set of manufacturing items in the virtual environment, and the first set of attributes characterize at least a set of manufacturing capabilities of the manufacturing items. Specifically, the first set of virtual items provided by the electronic device 110 in the first space comprise at least one set of manufacturing items in the virtual environment, for example, the equipment manufacturing station and consumable manufacturing station discussed above are included in the first set of virtual items. Therefore, the first character can still normally complete the interaction of prop manufacturing and production in the first place. Furthermore, as discussed above, the electronic device 110 can determine the first set of attributes of the first set of virtual items based on the second set of attributes of the second set of virtual items.

Figure 2D:
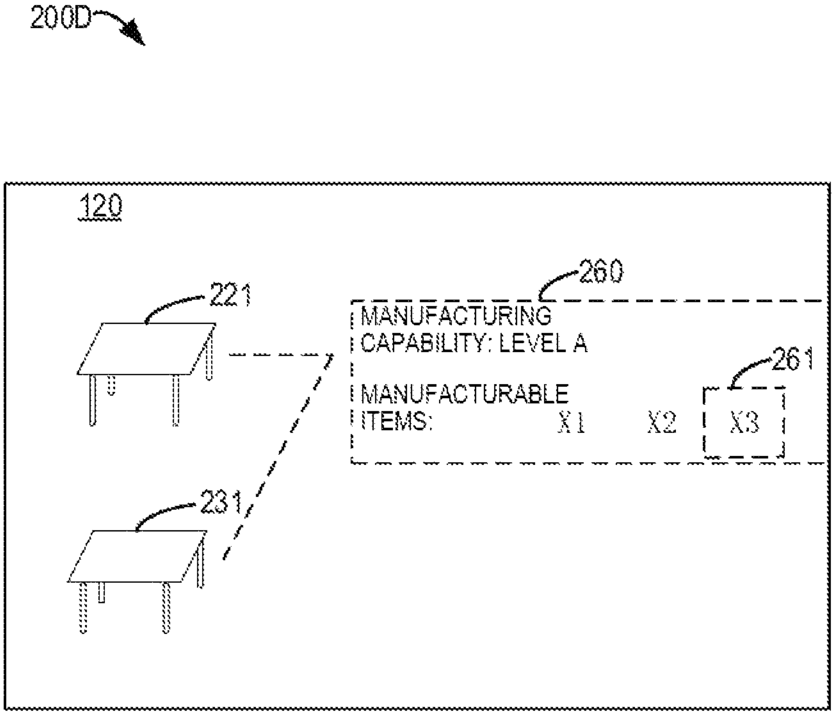

Illustratively, referring also to FIG. 2D, the electronic device 110 may provide manufacturing item(s) in the first space 210. The equipment manufacturing station 221 is shown as an example only. The electronic device 110 determines the ability of the first character 211 to use the equipment manufacturing station 221 based on the manufacturing ability of the equipment manufacturing station 231 used by the first character 211. After the electronic device 110 determines the ability of the first character 211 to use the equipment manufacturing station 221 based on the manufacturing ability of the equipment manufacturing station 231 used by the first character 211. The first character 211 uses the equipment manufacturing station 221 in the first place 220, or uses the equipment manufacturing station 231 in the second place 230, and has the same manufacturing ability (e.g., "Level A"). In some embodiments, the electronic device 110 may also provide a capability viewing entry (not shown in the figure). After the electronic device 110 receives the selection of the first character 211 for the capability viewing entry, the description information 260 is presented accordingly. Thus, the user can intuitively understand the prop manufacturing ability based on the description information 260. For example, the user can understand the current manufacturing ability level based on the description information 260, and items that can be manufactured, e.g., items "X1", "X2" and "X3".

In some embodiments, the number of first set of virtual items and/or the capability of the first set of virtual items are also determined based on the place attributes associated with the first place. Specifically, the electronic device 110 can determine the place attributes associated with the first place 220, such as the level of the place or the room type of the "hospice place". Furthermore, the electronic device 110 can also configure the number of first set of virtual items and/or the capability of the first set of virtual items based on the place attributes. Therefore, the number of first set of virtual items and/or the capability of the first set of virtual items can be configured differently based on the attributes of the first place, so that there are differences in different first places, which can not only enrich the user experience, but also enable service providers to differentially configure the first place according to their needs to meet the different needs of users.

Illustratively, referring to FIG. 2D, the electronic device 110 may adjust the number of items and/or prop capabilities in the first set of virtual items (e.g., items "X1", "X2", and "X3") based on the room type of the first place 220. For example, the electronic device 110 adjusts that the first character 211 cannot use the equipment manufacturing station 221 to manufacture items "X3".

In some embodiments, while the electronic device 110 is still presenting the description information 260, prompt information 261 is added accordingly to inform the user that the first character 211 cannot manufacture the prop "X3" with the virtual item 211.

In some embodiments, better permissions can be configured for the character of the second place 230 in conjunction with the fact that the second place 230 is usually associated with the character for a long time, so that the user can configure the layout of the second place 230, the selected virtual items, etc. Correspondingly, the electronic device 110 can also combine this situation to configure virtual items that achieve unique and independent functions for the second place 230. For example, the electronic device 110 can configure the "furniture placement" function for the "home place", allowing the user to personalize furniture such as placing sofas, beds, and chairs in the "home place". For example, the electronic device 110 allows the user to personalize vehicle display and vehicle modification in the "home place". In some embodiments, the electronic device 110 responds to the first character moving to the second space corresponding to the second place in the virtual environment, providing a usage entry for using the third set of virtual items in the second space, which is different from the second set of virtual items.

Specifically, the electronic device 110 detects that the first character 211 enters the second space corresponding to the second place 230, and provides a usage entry for the third set of virtual items different from the second set of virtual items in the second space. Such a third set of virtual items is used to implement functions specific to the second place 230.

Illustratively, referring to FIG. 2C, the electronic device 110 detects that the first character 211 enters the second space corresponding to the second place 230, and presents the usage entry 250 for implementing the "furniture placement" virtual items in the third set of virtual items. The electronic device 110 can provide furniture placement function after detecting the selection of the usage entry 250 by the first character 211. For example, the electronic device 110 presents a furniture selection page in a graphical interface and places the furniture selected by the user in the selection page in the second space. Illustratively, such a third set of virtual items can also include some living items in the "home place", such as virtual items such as beds and bathrooms.

In some embodiments, the first set of virtual items may further include a first charging item, the second set of virtual items may include a second charging item corresponding to the first charging item, wherein the use of the first charging item consumes a target virtual resource corresponding to the first character, and where the second charging item is available, the use of the second charging item does not consume the target virtual resource corresponding to the first character. Such target virtual resources may include, for example, virtual wealth available to the character in the virtual environment.

Specifically, when the electronic device 110 provides charging items in the first place 220 and the second place 230 respectively, for example, the electronic device 110 provides a charging interface 224 in the first place 220 to supplement power for virtual items or portable workstations that the character needs to use. Correspondingly, a charging interface 234 is provided in the second place 230.

Electronic device 110 also configures different virtual resource consumption strategies for charging items in different place. Therefore, different configurations based on different usage methods of virtual items in different places can not only make the virtual items more closely related to the places and enhance authenticity, but also encourage users to return to the second place to use virtual items in a way that is better than the resource consumption strategy of charging items in the first place.

Illustratively, referring to FIG. 2B, in the case where the first charging item, such as virtual item 224, is included in the first set of virtual items, the usage of virtual item 224 consumes the target virtual resources corresponding to the first character 211, such as virtual wealth. Conversely, if the first character 211 uses the charging interface 234 for charging in his home place, it will not consume the target virtual resources of the first character 211 in a timely manner, but will consume the power reserve of the home place. It should be understood that the first character 211 can also increase the power reserve of the home place by consuming virtual resources.

In some embodiments, the electronic device 110 may also: in response to receiving a second request for controlling the first character to drop out of the first place, disassociate the first character from the first place, so that the first character can use the second set of virtual items corresponding to the first set of virtual items in the second place. Specifically, when the electronic device 110 receives the second request for the first character 211 to drop out of the first place, the electronic device 110 disassociates the first character from the first place, and release the first character from using the second set of virtual items corresponding to the first set of virtual items in the second place.

Illustratively, the behavior of the first character 211 requesting the unlink of the first place 220 (e.g., the behavior of leaving the "hospice place") may also be referred to as the behavior of back home. Thus, after the user disassociates from the first place, the availability of virtual items for the second place associated with the user is restored, so that the user can conveniently select the place to use the virtual items according to their needs.

In some embodiments, the electronic device 110 receives a second request based on the interaction between the first character and the first place. In particular, the electronic device 110 may send a second request to the electronic device 110 by presenting a request entry in a graphical interface such that the first character may interact with the request entry.

Figure 2E:
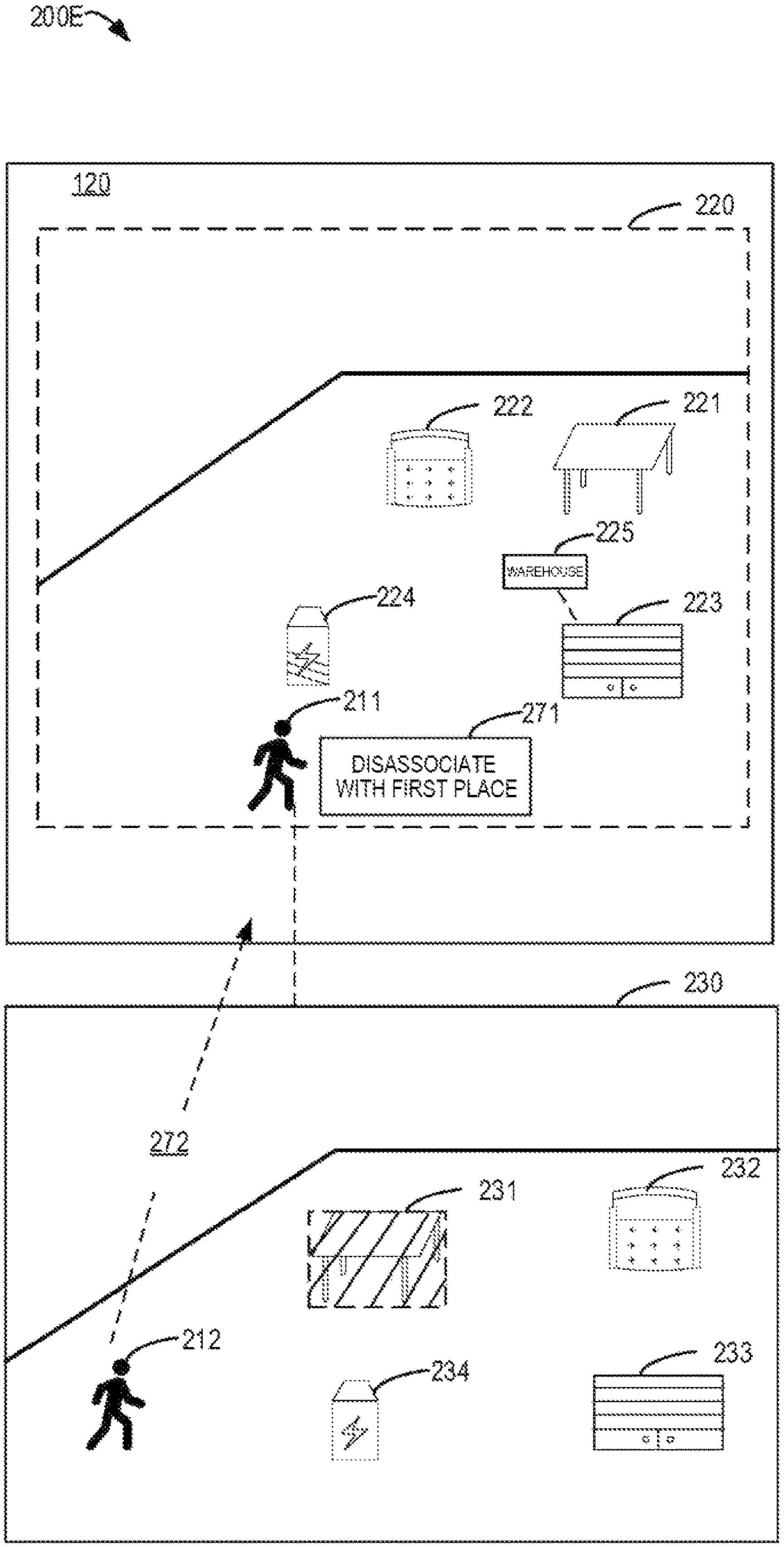

Illustratively, referring to FIG. 2E, the electronic device 110 may present a request transmission entry 271 in association with the first place 220 so that the first character 211 selects the request transmission entry 271. Further, the electronic device 110 disassociates the first character 211 from the first place 220 upon detecting the first character 211 selects the request transmission entry 271. Further, the electronic device 110 restores the availability of virtual items in the second place associated with the user, for example, making the equipment manufacturing station 231 available to the first character 211.

Taking "Home Place" as an example, after the character leaves the "Hospice Place", the character can reuse virtual items that were previously disabled in the "Home Place".

In some embodiments, the second place is also associated with a second character, and the electronic device 110 may also receive an invitation from the second character to invite the first character back to the second place. Further, based on the confirmation of the invitation by the first character, the second request is received.

Specifically, in the case where the second character is also associated with the second place, such as the "home place", not only is the first character 211 associated, but also the second character 212 that has a "roommate relationship" with the first character 211, the electronic device 110 can receive an invitation from the second character 212 to invite the first character back to the second place. Therefore, other characters associated with the same place are allowed to send invitations to the users of the first character, inviting the first character to "go home", avoiding social distance caused by the first character leaving the second place for a long time, and maintaining social relationships between users.

Figure 2F:
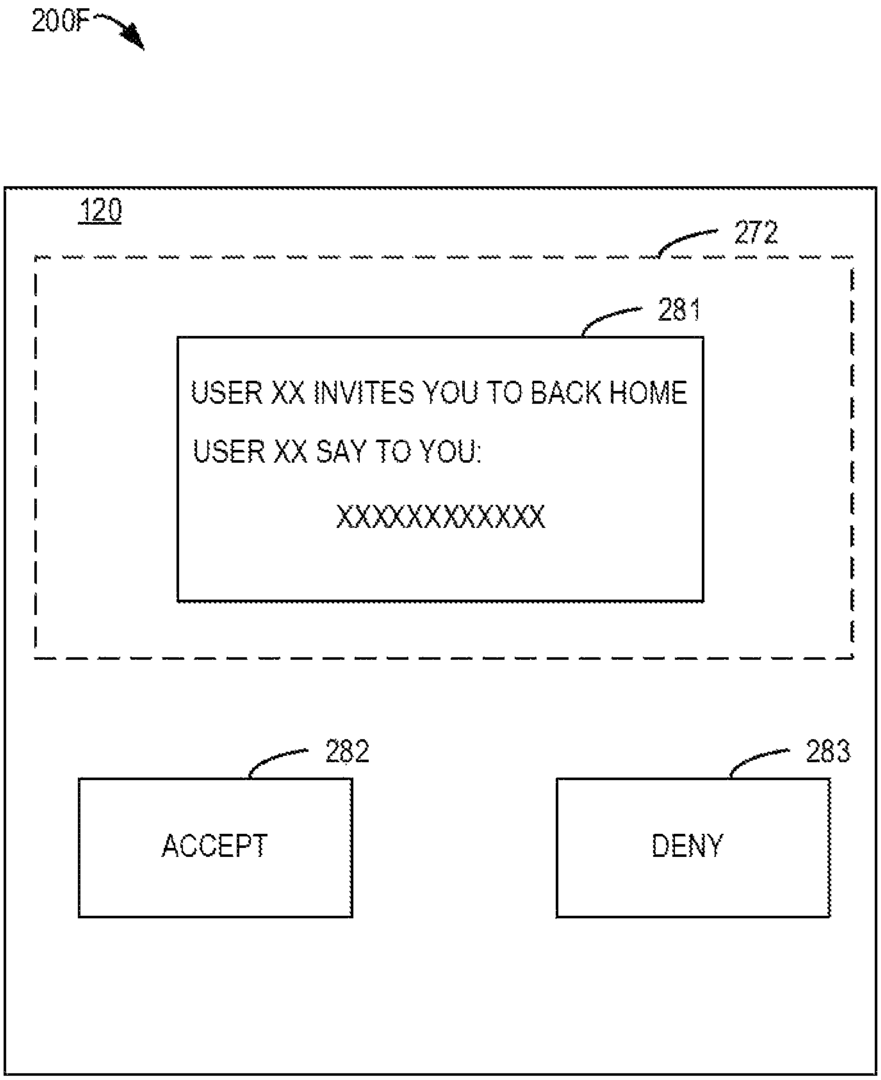

Illustratively, referring to FIGS. 2E and 2F, the electronic device 110 can receive the invitation information 272 sent by the second character 212, inviting the first character 211 to disassociate from the first place. After receiving the invitation information 272, the electronic device 110 can present the specific content of the invitation information 272, such as the description information 281, on the screen interface 120. Furthermore, the electronic device 110 can also associate the description information 281 in the screen interface 120 to present the acceptance entry 282 for confirming the invitation and the rejection entry 283 for rejecting the invitation. The electronic device 110 can determine whether the first character 211 accepts the "go home" invitation based on the selection results for the acceptance entry 282 and the rejection entry 283 for rejecting the invitation. Furthermore, the electronic device 110 receives the above-mentioned second request sent by the first character 211 when it is determined that the acceptance entry 282 is selected.

In some embodiments, the electronic device 110 may also periodically charge a "usage fee" to the first character 211 based on the associated time after the first character 211 is associated with the first place. In some embodiments, the electronic device 110 may also periodically assign tasks to the first character 211, such as cleaning the first place 220, so that the first character 211 can offset the "usage fee" by completing the task. Therefore, the first character 211 is urged to avoid long-term association with the first place and waste of resources.

In some embodiments, after receiving the second request sent by the first character 211, the electronic device 110 can also check whether the first character 211 has fully paid the "usage fee". Furthermore, when the first character 211 has unpaid "usage fee", the electronic device 110 prompts the first character 211 and collects the unpaid "usage fee" from the first character 211. Correspondingly, the electronic device 110 can release the association with the first place 220 when the first character 211 has fully paid the "usage fee".

In some embodiments, the electronic device 110 may also: receive a third request from the third character to access the first space. Further, present the first space of the virtual environment to the user associated with the third character.

Specifically, the electronic device 110 can present the request information of the third request in the graphical interface to receive the confirmation of the first character when receiving the third request of the third character to access the first space.

Correspondingly, the electronic device 110 can determine whether the first character allows the third character to access the first place. Furthermore, when the electronic device 110 determines that the third character is allowed to access the first place, it presents an image of the first space corresponding to the first place to the user associated with the third character, thereby realizing the access of the third character to the first place. Therefore, users can adjust the openness of the first place relative to other characters according to their own needs, taking into account the independent use and privacy needs of the first character for the first place, as well as the social needs of the first character.

Figure 2G:
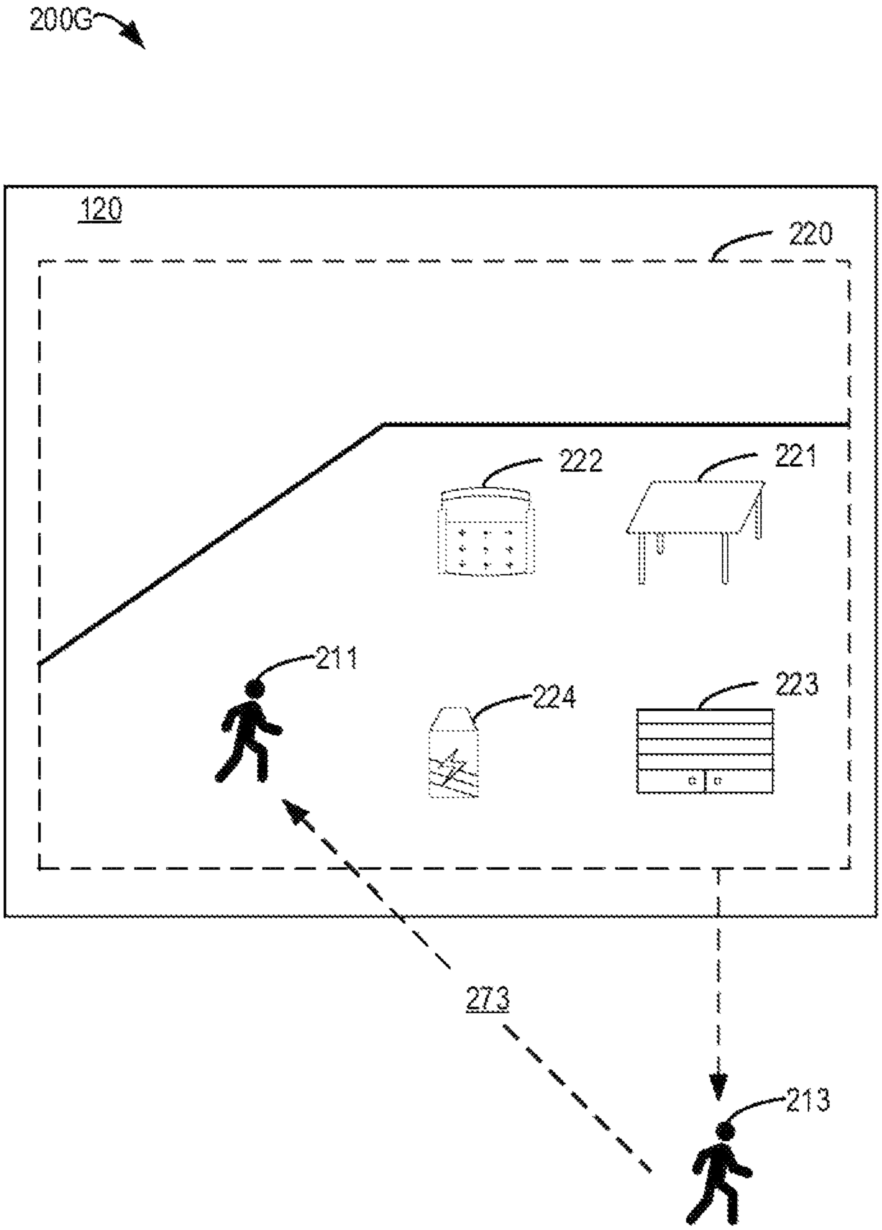

For example, referring to FIG. 2G, if the third character 213 expects to access the first place 220, or if the third character 213 expects to enter the first space corresponding to the first place 220, the third character 213 can make a third request to the first character 211, such as an access request 273.

In some embodiments, the electronic device 110, upon receiving the access request 273, inquires the first character 211 whether to allow the third character 213 to enter the first place 220. For example, the electronic device 110 presents the inquiry information in the graphic interface 120, and is used to accept the access entry and deny the access entry. The electronic device 110 can determine whether to allow the third character 213 to enter the first space corresponding to the first place 220 based on the selection of the first character 211 to accept the access entry. In the case where the electronic device 110 determines that the first character 211 chooses to accept the access entry, the first space is presented to the user associated with the third character 213, so that the third character 213 can enter the first space and access the first place 220.

As an alternative or additionally, the third character 213 may include the second character 212 discussed above. Thus, the second that has a specific association with the first character is allowed to establish communication with the first character in the form of access, narrowing social distance and resolving conflicts between users.

Based on the interaction process described above, on the one hand, it is possible to associate virtual environments for using virtual items with characters, and virtual items can still be used without affecting the association relationship of the original virtual environment. On the other hand, it is possible to adjust the availability of virtual items in the original associated virtual environment to avoid disrupting the interaction balance. Therefore, users can flexibly choose the virtual environment for using virtual items.

It should be understood that the specific number of elements and specific values in the specific interface described in the above examples are only illustrative and are not intended to limit the present disclosure.

Example Process

Figure 3:
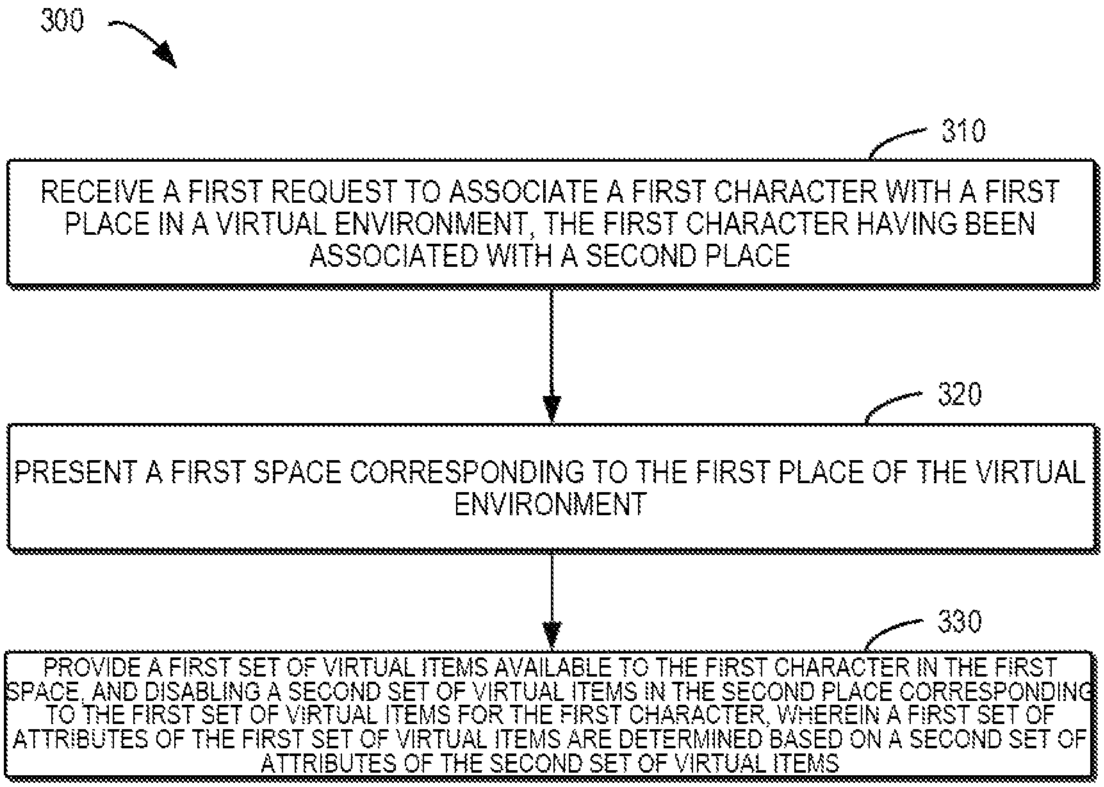
FIG. 3 shows a flowchart of an example process for interacting in a virtual environment according to some embodiments of the present disclosure.

FIG. 3 illustrates a flow chart of a process 300 for interacting with a virtual object in accordance with some embodiments of the present disclosure. process 300 may be implemented by the electronic device 110 of FIG. 1 independently, or by a combination of the electronic device 110 with other computing devices. process 300 will be described in conjunction with FIG. 1 for ease of discussion.

As shown in FIG. 3, at block 310, the electronic device 110 receives a first request to associate a first character with a first place in a virtual environment, the first character having been associated with a second place.

At block 320, the electronic device 110 presents a first space corresponding to the first place in the virtual environment.

At block 330, the electronic device 110 provides a first set of virtual items available to the first character in the first space, and disables a second set of virtual items corresponding to the first set of virtual items in the second place for the first character, wherein a first set of attributes of the first set of virtual items are determined based on a second set of attributes of the second set of virtual items.

In some embodiments, receiving the first request comprises: in response to a second character being associated with the second place, providing a request entry for associating the first character with the first place; and receiving the first request based on a selection of the request entry.

In some embodiments, the electronic device 110 may also: in response to the first character moving to a second space corresponding to the second place in the virtual environment, provide a usage entry for using a third set of virtual items in the second space, the third set of virtual items being different from the second set of virtual items.

In some embodiments, the first set of virtual items comprise a set of manufacturing items in the virtual environment, and the first set of attributes characterize at least a manufacturing capability of a set of manufacturing items.

In some embodiments, the electronic device 110 may further: in response to the first character being located in the first space, provides a first warehouse entry for accessing a private warehouse space of the first character; and in response to the first character being located in the second space, provides a second warehouse entry for accessing the private warehouse space of the first character, wherein the first warehouse entry and the second warehouse entry correspond to the same data.

In some embodiments, a number of the first set of virtual items and/or a capability of the first set of virtual items is further determined based on a place attribute associated with the first place.

In some embodiments, the first set of virtual items comprise a first charging item, and the second set of virtual items comprises a second charging item corresponding to the first charging item, wherein a usage of the first charging item consumes a target virtual resource corresponding to the first character, and a usage of the second charging item does not consume the target virtual resource corresponding to the first character if the second charging item is available.

In some embodiments, the electronic device 110 may also: in response to receiving a second request for controlling the first character to drop out of the first place, disassociate the first character from the first place such that the first character can use the second set of virtual items corresponding to the first set of virtual items in the second place.

In some embodiments, the electronic device 110 may also: receive the second request based on an interaction between the first character and the first place.

In some embodiments, the second place is also associated with a second character, and the electronic device 110 may also: receive an invitation from the second character to invite the first character to return to the second place; and receive the second request based on a confirmation of the invitation by the first character.

In some embodiments, the electronic device 110 may also: receive a third request for a third character to access the first space; and present the first space of the virtual environment to a user associated with the third character.

Example Apparatus and Equipment

Figure 4:
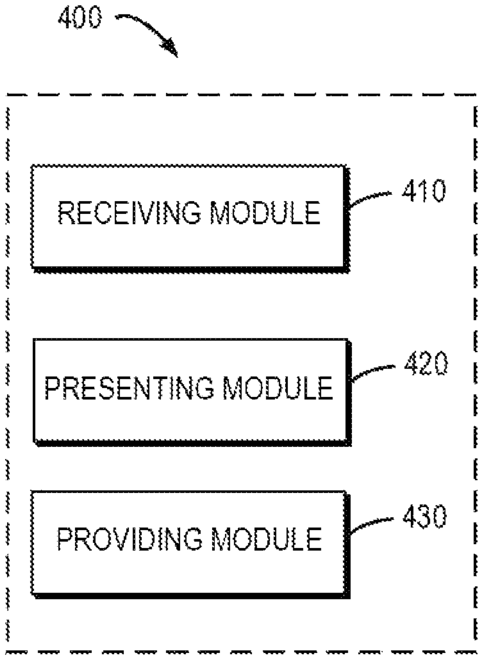
FIG. 4 shows a block diagram of an apparatus for interaction in a virtual environment according to some embodiments of the present disclosure.

Embodiments of the present disclosure also provide corresponding devices for implementing the above methods or processes. FIG. 4 shows a schematic structural diagram of the apparatus 400 for interaction in a virtual environment according to some embodiments of the present disclosure.

As shown in FIG. 4, the apparatus 400 comprises a receiving module 410, configured to receive a first request to associate a first character with a first place in a virtual environment, the first character having been associated with a second place.

The apparatus 400 also comprises a presenting module 420, configured to present a first space corresponding to the first place in the virtual environment.

In addition, the apparatus 400 also comprises a providing module 430, configured to provide a first set of virtual items available to the first character in the first space, and disabling a second set of virtual items corresponding to the first set of virtual items in the second place for the first character, wherein a first set of attributes of the first set of virtual items are determined based on a second set of attributes of the second set of virtual items.

In some embodiments, the receiving module 410 is further configured to: in response to a second character being associated with the second place, provide a request entry for associating the first character with the first place; and receive the first request based on a selection of the request entry.

In some embodiments, the apparatus 400 further comprises a usage providing module configured to: in response to the first character moving to a second space corresponding to the second place in the virtual environment, provide a usage entry for using a third set of virtual items in the second space, the third set of virtual items being different from the second set of virtual items.

In some embodiments, the first set of virtual items comprise a set of manufacturing items in the virtual environment, and the first set of attributes characterize at least a manufacturing capability of a set of manufacturing items.

In some embodiments, the apparatus 400 further comprises: a first warehouse providing module configured to in response to the first character being located in the first space, provides a first warehouse entry for accessing a private warehouse space of the first character. The apparatus 400 further comprises: a second warehouse providing module configured to in response to the first character being located in the second space, provides a second warehouse entry for accessing the private warehouse space of the first character, wherein the first warehouse entry and the second warehouse entry correspond to the same data.

In some embodiments, a number of the first set of virtual items and/or a capability of the first set of virtual items is further determined based on a place attribute associated with the first place.

In some embodiments, the first set of virtual items comprise a first charging item, and the second set of virtual items comprises a second charging item corresponding to the first charging item, wherein a usage of the first charging item consumes a target virtual resource corresponding to the first character, and a usage of the second charging item does not consume the target virtual resource corresponding to the first character if the second charging item is available.

In some embodiments, the apparatus 400 further comprises: a release module configured to: in response to receiving a second request for controlling the first character to drop out of the first place, disassociate the first character from the first place such that the first character can use the second set of virtual items corresponding to the first set of virtual items in the second place.

In some embodiments, the apparatus 400 further comprises: a release receiving module configured to receive the second request based on an interaction between the first character and the first place.

In some embodiments, the second place is also associated with a second character, and the apparatus 400 further comprises: an invitation receiving module configured to receive an invitation from the second character to invite the first character to return to the second place; and receive the second request based on a confirmation of the invitation by the first character.

In some embodiments, the apparatus 400 further comprises: an access receiving module configured to receive a third request for a third character to access the first space; and present the first space of the virtual environment to a user associated with the third character.

The units included in apparatus 400 can be implemented in various ways, including software, hardware, firmware, or any combination thereof. In some embodiments, one or more units can be implemented using software and/or firmware, such as machine-executable instructions stored on a storage medium. In addition to or instead of machine-executable instructions, some or all of the units in apparatus 400 can be implemented at least in part by one or more hardware logic components. By way of example and not limitation, exemplary types of hardware logic components that can be used include field programmable gate arrays (FPGAs), application-specific integrated circuits (ASICs), application-specific standards (ASSPs), system-on-chips (SOCs), complex programmable logic devices (CPLDs), and the like.

Figure 5:
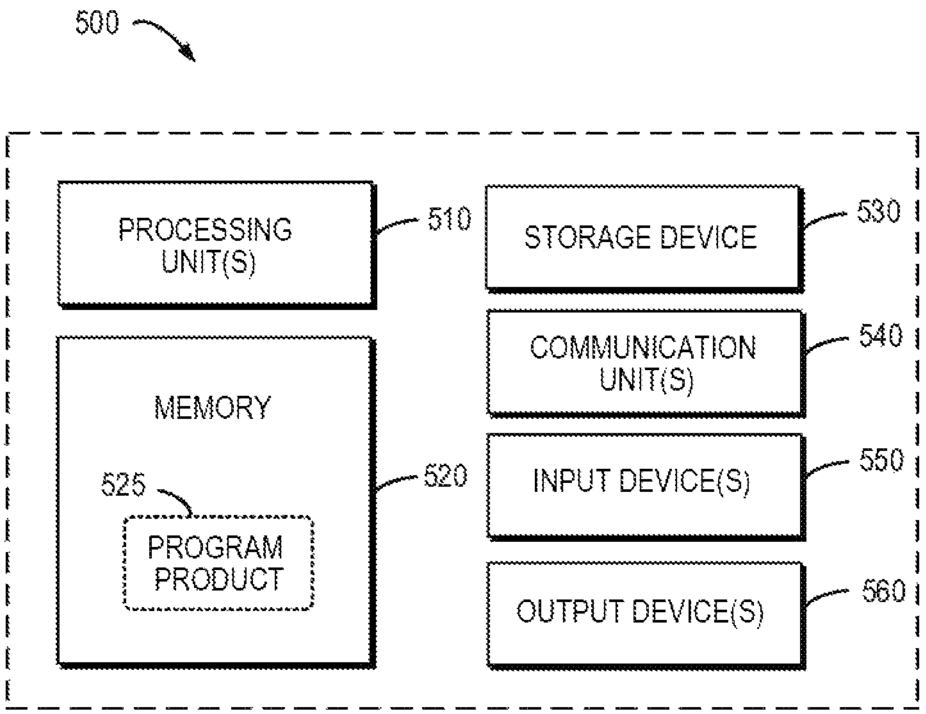
FIG. 5 shows a block diagram of a device that can implement multiple embodiments of the present disclosure.

FIG. 5 illustrates a block diagram of a computing device/server 500 in which one or more embodiments of the present disclosure may be implemented. it should be understood that the computing device/server 500 illustrated in FIG. 5 is merely exemplary and should not constitute any limitation as to the functionality and scope of the embodiments described herein.

As shown in FIG. 5, the computing device/server 500 is in the form of a general purpose computing device. components of the computing device/server 500 may include, but are not limited to, one or more processors or processing units 510, memory 520, storage device 530, one or more communication units 540, one or more input devices 560, and one or more output devices. the processing unit 510 may be an actual or virtual processor and is capable of performing various processes based on programs stored in the memory 520. In a multiprocessor system, multiple processing units execute computer-executable instructions in parallel to improve the parallel processing capability of the computing device/server 500.

Computing device/server 500 typically includes multiple computer storage media. Such media can be any available media accessible to computing device/server 500, including but not limited to volatile and non-volatile media, removable and non-removable media. Memory 520 can be volatile memory (such as registers, caches, random access memory (RAM)), non-volatile memory (such as read-only memory (ROM), electrically erasable programmable read-only memory (EEPROM), flash memory), or some combination thereof. Storage device 530 can be removable or non-removable media, and can include machine-readable media such as flash drives, disks, or any other media that can be used to store information and/or data (such as training data for training) and can be accessed within computing device/server 500.

The computing device/server 500 may further include additional removable/non-removable, volatile/non-volatile storage media. Although not shown in FIG. 5, a disk drive for reading or writing from a removable, non-volatile disk (e.g., a "floppy disk") and an optical disk drive for reading or writing from a removable, non-volatile optical disk may be provided. In these cases, each drive may be connected to a bus (not shown) by one or more data media interfaces. The memory 520 may include a computer program product 525 having one or more program modules configured to perform various methods or acts of various embodiments of the present disclosure.

The communication unit 540 enables communication with other computing devices through a communication medium. additionally, the functions of the components of the computing device/server 500 may be implemented in a single computing cluster or multiple computing machines capable of communicating through a communication connection. thus, the computing device/server 500 may operate in a networked environment using logical connections with one or more other servers, a network personal computer (PC), or another network node.

The input device 550 may be one or more input devices, such as a mouse, keyboard, trackball, etc. The output device 560 may be one or more output devices, such as a display, speaker, printer, etc. The computing device/server 500 may also communicate, as desired, via the communication unit 540, with one or more external devices (not shown), such as storage devices, display devices, etc., with one or more devices that enable a user to interact with the computing device/server 500, or with any device (e.g., network interface card, modem, etc.) that enables the computing device/server 500 to communicate with one or more other computing devices. Such communication may be performed via an input/output (I/O) interface (not shown).

According to exemplary implementations of the present disclosure, a computer-readable storage medium is provided having one or more computer instructions stored thereon, wherein the one or more computer instructions are executed by a processor to implement the methods described above.

Various aspects of the present disclosure are described herein with reference to flowcharts and/or block diagrams of methods, apparatus (systems), and computer program products implemented in accordance with the present disclosure. It should be understood that each block of the flowcharts and/or block diagrams and combinations of the blocks in the flowcharts and/or block diagrams can be implemented by computer-readable program instructions.

These computer-readable program instructions may be provided to a processing unit of a general purpose computer, special purpose computer, or other programmable data processing device to produce a machine that, when executed by a processing unit of a computer or other programmable data processing device, produces a device that implements the functions/actions specified in one or more blocks in the flowchart and/or block diagrams. These computer-readable program instructions may also be stored in a computer-readable storage medium, which causes the computer, programmable data processing device, and/or other device to operate in a specific manner. Thus, the computer-readable medium storing the instructions includes an article of manufacture that includes instructions for implementing various aspects of the functions/actions specified in one or more blocks in the flowchart and/or block diagrams.

Computer-readable program instructions can also be loaded onto a computer, other programmable data processing device, or other device to perform a series of operational steps on the computer, other programmable data processing device, or other device to produce a computer-implemented process, so that the instructions executed on the computer, other programmable data processing device, or other device implement the functions/actions specified in one or more blocks in the flowchart and/or block diagram.

The flowcharts and block diagrams in the accompanying drawings show the architecture, functions, and operations of possible implementations of systems, methods, and computer program products according to the present disclosure. In this regard, each block in the flowcharts or block diagrams may represent a module, program segment, or part of an instruction that contains one or more executable instructions for implementing a specified logical function. In some alternative implementations, the functions marked in the blocks may also occur in a different order than those marked in the drawings. For example, two consecutive blocks can actually be executed in parallel, and they can sometimes be executed in the opposite order, depending on the functions involved. It should also be noted that each block in the diagrams and/or flowcharts, as well as combinations of blocks in the diagrams and/or flowcharts, can be implemented using a dedicated hardware-based system that performs the specified functions or actions, or can be implemented using a combination of dedicated hardware and computer instructions.

The above has described the various implementations of the present disclosure. The above description is exemplary, not exhaustive, and is not limited to the various implementations disclosed. Without departing from the scope and spirit of the various implementations described, many modifications and changes are obvious to those skilled in the art. The choice of terminology used in this article is intended to best explain the principles, practical applications, or improvements to the technology in the market, or to enable other ordinary technicians in the art to understand the various implementations disclosed in this article.

We claim:

1. An interaction method in a virtual environment implemented at an electronic device, comprising:

receiving, by the electronic device, a first request to associate a first character with a first place in a virtual environment, the first character having been associated with a second place;

presenting, by the electronic device, a first space corresponding to the first place in the virtual environment; and providing, by the electronic device, a first set of virtual items available to the first character in the first space, and disabling a second set of virtual items corresponding to the first set of virtual items in the second place for the first character, wherein a first set of attributes of the first set of virtual items are determined based on a second set of attributes of the second set of virtual items;

in response to the first character being located in the first space, providing, by the electronic device, a first warehouse entry for accessing a private warehouse space of the first character; and in response to the first character being located in a second space corresponding to the second place in the virtual environment, providing, by the electronic device, a second warehouse entry for accessing the private warehouse space of the first character, wherein the first warehouse entry and the second warehouse entry correspond to the same data.

2. The method of claim 1, wherein receiving the first request comprises:

in response to a second character being associated with the second place, providing a request entry for associating the first character with the first place; and receiving the first request based on a selection of the request entry.

3. The method of claim 1, further comprising:

in response to the first character moving to the second space corresponding to the second place in the virtual environment, providing a usage entry for using a third set of virtual items in the second space, the third set of virtual items being different from the second set of virtual items.

4. The method of claim 1, wherein the first set of virtual items comprise a set of manufacturing items in the virtual environment, and the first set of attributes characterize at least a manufacturing capability of a set of manufacturing items.

5. The method of claim 1, wherein a number of the first set of virtual items and/or a capability of the first set of virtual items is further determined based on a place attribute associated with the first place.

6. The method of claim 1, wherein the first set of virtual items comprise a first charging item, and the second set of virtual items comprises a second charging item corresponding to the first charging item, wherein a usage of the first charging item consumes a virtual resource corresponding to the first character, and a usage of the second charging item does not consume the virtual resource corresponding to the first character if the second charging item is available.

7. The method of claim 1, further comprising:

in response to receiving a second request for controlling the first character to drop out of the first place, disassociating the first character from the first place such that the first character can use the second set of virtual items corresponding to the first set of virtual items in the second place.

8. The method of claim 7, further comprising:

receiving the second request based on an interaction between the first character and the first place.

9. The method of claim 7, wherein the second place is further associated with a second character, the method further comprises:

receiving an invitation from the second character to invite the first character to return to the second place; and receiving the second request based on a confirmation of the invitation by the first character.

10. The method of claim 1, further comprising:

receiving a third request for a third character to access the first space; and presenting the first space of the virtual environment to a user associated with the third character.

11. An electronic device comprising:

at least one processing unit; and at least one memory, the at least one memory being coupled to the at least one processing unit and storing instructions for execution by the at least one processing unit, the instructions, when executed by the at least one processing unit, causing the device to perform a method comprising:

receiving, by the electronic device, a first request to associate a first character with a first place in a virtual environment, the first character having been associated with a second place;

presenting, by the electronic device, a first space corresponding to the first place in the virtual environment; and providing, by the electronic device, a first set of virtual items available to the first character in the first space, and disabling a second set of virtual items corresponding to the first set of virtual items in the second place for the first character, wherein a first set of attributes of the first set of virtual items are determined based on a second set of attributes of the second set of virtual items;

in response to the first character being located in the first space, providing, by the electronic device, a first warehouse entry for accessing a private warehouse space of the first character; and in response to the first character being located in a second space corresponding to the second place in the virtual environment, providing, by the electronic device, a second warehouse entry for accessing the private warehouse space of the first character, wherein the first warehouse entry and the second warehouse entry correspond to the same data.

12. The electronic device of claim 11, wherein receiving the first request comprises:

in response to a second character being associated with the second place, providing a request entry for associating the first character with the first place; and receiving the first request based on a selection of the request entry.

13. The electronic device of claim 11, the method further comprising:

in response to the first character moving to the second space corresponding to the second place in the virtual environment, providing a usage entry for using a third set of virtual items in the second space, the third set of virtual items being different from the second set of virtual items.

14. The electronic device of claim 11, wherein the first set of virtual items comprise a set of manufacturing items in the virtual environment, and the first set of attributes characterize at least a manufacturing capability of a set of manufacturing items.

15. The electronic device of claim 11, wherein a number of the first set of virtual items and/or a capability of the first set of virtual items is further determined based on a place attribute associated with the first place.

16. The electronic device of claim 11, wherein the first set of virtual items comprise a first charging item, and the second set of virtual items comprises a second charging item corresponding to the first charging item, wherein a usage of the first charging item consumes a virtual resource corresponding to the first character, and a usage of the second charging item does not consume the virtual resource corresponding to the first character if the second charging item is available.

17. The electronic device of claim 11, the method further comprising:

in response to receiving a second request for controlling the first character to drop out of the first place, disassociating the first character from the first place such that the first character can use the second set of virtual items corresponding to the first set of virtual items in the second place.

18. A non-transitory computer-readable storage medium having stored thereon a computer program which, when executed by a processor, implements a method comprising:

receiving, by an electronic device, a first request to associate a first character with a first place in a virtual environment, the first character having been associated with a second place;

presenting, by the electronic device, a first space corresponding to the first place in the virtual environment; and providing, by the electronic device, a first set of virtual items available to the first character in the first space, and disabling a second set of virtual items corresponding to the first set of virtual items in the second place for the first character, wherein a first set of attributes of the first set of virtual items are determined based on a second set of attributes of the second set of virtual items;

in response to the first character being located in the first space, providing, by the electronic device, a first warehouse entry for accessing a private warehouse space of the first character; and in response to the first character being located in a second space corresponding to the second place in the virtual environment, providing, by the electronic device, a second warehouse entry for accessing the private warehouse space of the first character, wherein the first warehouse entry and the second warehouse entry correspond to the same data.

* * * * *